United States Patent
Perlman (10) Patent No.: US 7,363,499 B2
(45) Date of Patent: *Apr. 22, 2008

(54) BLINDED ENCRYPTION AND DECRYPTION

(75) Inventor: Radia J Perlman, Sammamish, WA (US)

(73) Assignee: Sun Microsystems, Inc., Santa Clara, CA (US)

(*) Notice: Subject to any disclaimer, the term of this patent is extended or adjusted under 35 U.S.C. 154(b) by 865 days.

This patent is subject to a terminal disclaimer.

(21) Appl. No.: 10/664,799

(22) Filed: Sep. 18, 2003

(65) Prior Publication Data

US 2005/0066174 A1 Mar. 24, 2005

(51) Int. Cl.
H04L 9/00 (2006.01)
(52) U.S. Cl. ....................................... 713/176
(58) Field of Classification Search ................. 713/176
See application file for complete search history.

(56) References Cited

U.S. PATENT DOCUMENTS

| | | | | |
|---|---|---|---|---|
| 4,759,063 A | * | 7/1988 | Chaum | 380/30 |
| 4,914,698 A | * | 4/1990 | Chaum | 380/30 |
| 4,947,430 A | * | 8/1990 | Chaum | 713/180 |
| 5,347,580 A | | 9/1994 | Molva et al. | |
| 5,491,750 A | | 2/1996 | Bellare et al. | |
| 5,564,106 A | * | 10/1996 | Puhl et al. | 380/286 |
| 5,638,445 A | * | 6/1997 | Spelman et al. | 705/77 |
| 5,737,419 A | | 4/1998 | Ganesan | |
| 5,812,669 A | | 9/1998 | Jenkins et al. | |
| 6,009,173 A | | 12/1999 | Sumner | |
| 6,044,462 A | | 3/2000 | Zubeldia et al. | |
| 6,049,613 A | * | 4/2000 | Jakobsson | 380/47 |
| 6,055,314 A | | 4/2000 | Spies et al. | |
| 6,185,685 B1 | | 2/2001 | Morgan et al. | |
| 6,240,187 B1 | | 5/2001 | Lewis | |
| 6,246,970 B1 | | 6/2001 | Silverbrook et al. | |
| 6,308,277 B1 | | 10/2001 | Vaeth et al. | |
| 6,367,019 B1 | | 4/2002 | Ansell et al. | |
| 7,058,808 B1 | * | 6/2006 | Zolotorev et al. | 713/176 |
| 2002/0136410 A1 | | 9/2002 | Hanna et al. | |
| 2003/0161472 A1 | | 8/2003 | Tong et al. | |

FOREIGN PATENT DOCUMENTS

GB 2402852 A 12/2004
WO WO0120836 A2 3/2001

OTHER PUBLICATIONS

GEMPLUS, "Data Sheets of Gemplus", Date Unknown.
McNamara, "E-mail that Disappears", http://www.nwfusion.com/archive/1999b/0830netbuzz.html, Aug. 30, 1999, 4 pages.
Menezes, et al., "Handbook of Applied Cryptography", CRC Press, 1997, 581-86.
Schlumberger, "Data Sheets of Schlumberger", Date Unknown.
Menezes, Alfred J., van Oorschot, Paul C. and Vanstone, Scott A., "Handbook of Applied Cryptography", CRC Press, Oct. 1996, pp. 475 and 487.

* cited by examiner

*Primary Examiner*—Matthew B Smithers
(74) *Attorney, Agent, or Firm*—Osha·Liang LLP (57) ABSTRACT

A method and system for utilizing and encryption or decryption agent so as to preclude access by the encryption agent or decryption agent, respectively, to the information being encrypted or decrypted. To preclude access by the encryption agent, a blinding function is applied to the information prior to forwarding such information to the encryption agent for encryption. To preclude access to the information by the decryption agent, a blinding function is applied to the encrypted information prior to forwarding the encrypted information to the decryption agent for decryption. Once the information has been returned, the information is unblinded, leaving an encrypted or decrypted message respectively.

24 Claims, 6 Drawing Sheets

BLINDED ENCRYPTION AND DECRYPTION

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention pertains to secure communications in computer networks and more particularly, to a method and system for performing blinded encryption and decryption in which an encryption agent, decryption agent, or both are denied access to the information being encrypted or decrypted.

The use of encryption in computer networks and particularly the use of public key cryptographic systems such as the well-known RSA algorithm that employ public/private key pairs is well known. In certain circumstances, e.g. systems involving secret recovery, ephemeral decryptability, or enforcement of payment for services, encryption and/or decryption requires the involvement of a third party. Traditional approaches involving decryption by a decryption agent have resulted in the decryption agent having access to the decrypted information. This circumstance requires the decryption agent to be trustworthy. It would be preferable in certain applications to preclude the decryption agent from having access to sensitive information, notwithstanding the decryption agent's participation in the decryption process. Other traditional approaches require authenticating the decryption agent, which is expensive and assumes the existence of a secure public key infrastructure (PKI).

A technology involving blinded signatures is generally related but employed for a different purpose. In the case of a blinded signature, a party (e.g. party B) would like to have some information M signed by party C. Party B, however, does not want party C to be able to access the information M in the document being signed.

To achieve a blinded signature, party B picks a random value R and encrypts R with the RSA public key (e,n) of party C to form an encrypted value. Party B then multiplies the encrypted value by the message M to form a string $S=(R^e \mod n)*M$. The string S is communicated to Party C. Party C applies its RSA private key (d,n) to the string S to obtain the string $Z=[R]*[M^d] \mod n$. Party C communicates the string Z to party B. B then divides the string Z by the random number R obtain the signed document $M^d \mod n$. In the foregoing manner, party B has obtained a copy of the message M signed by Party C without exposing the information M to Party C.

There are several applications in which a decryption agent might aid in decrypting a message. For example, key recovery is a typical application in which the message, which is the secret key, is encrypted with the decryption agent's public key, or a secret key S is used to encrypt the message, and S is encrypted with the decryption agent's public key. If there is no other way to recover the message, for instance because all other copies are lost, then the encrypted message (or the encrypted secret key S) is sent to the decryption agent for decryption. If the decryption agent is not authenticated, it is possible to have a man-in the-middle attack in which an active attacker gets between the client and the decryption agent, and has access to all the data, including the decrypted message, or S if applicable. Another example where a decryption agent is used for decryption is with ephemeral decryption such as disclosed in U.S. Pat. No. 6,363,480 that is assigned to the same assignee as the present application.

It would therefore be desirable to have a system and method that permits an encryption and/or decryption agent to participate in the encryption and decryption process in a manner that does not provide the encryption and/or decryption agent with access to the actual information being encrypted or decrypted.

BRIEF SUMMARY OF THE INVENTION

In accordance with the present invention, a method and system for performing blinded encryption and decryption is disclosed. A message is encrypted in a way that only a decryption agent can decrypt the message. To decrypt the encrypted message, an encrypted message is blinded by a first node and communicated to a decryption agent. The decryption agent decrypts the message and returns the blinded message to the first node. The first node then unblinds the blinded message to obtain the original message. The encrypted message may be encrypted without the cooperation of an encryption agent by using a public key of a public/private key pair such as an RSA encryption key (e,n) or a Diffie-Hellman key ($g^x$,p). Alternatively, the message is encrypted with the cooperation of an encryption agent where the encryption agent maintains a secret encryption and decryption key. In this instance, the message is blinded prior to providing the message to the encryption agent and unblinded upon being returned to the originating node. The above-described blinding process may be performed via any mathematical operations by which pairs of functions that are inverses of one another are used to encrypt/decrypt and to blind/unblind the message and can be performed in any order.

In one embodiment, a first node that desires to employ blinded decryption of a message, encrypts a clear message, forming an encrypted message. The first node applies a known public key (e,n) of an RSA public/private pair held by the decryption agent to encrypt the message M by raising M to the power e mod n, $M^e$ mod n. To securely decrypt the encrypted message, the first node selects a blinding number R, which can be a randomly generated number, and determines the multiplicative inverse of R as $R^{-1}$ that satisfies $R*R^{-1}=1$ mod n and blinds the encrypted message using R by raising R to the power e mod n, $R^e$ mod n, and multiplying this result by the encrypted message M, forming a first blinded message ($R^e*M^e$) mod n. The first node provides the first blinded message to a decryption agent that decrypts the first blinded message by applying the RSA private key (d,n) of the public/private key pair by raising the first blinded message to the power d mod n, ($R^e$ mod n)$^d$ mod n($M^e$ mod n)$^d$ mod n, forming a second blinded message R*M mod n. The second blinded message is returned to the first node and the first node operates on the second blinded message by multiplying the second blinded message by the multiplicative inverse of R, i.e., $R^{-1}$ mod n, to form the original clear message, M.

In another embodiment, a first node that desires to employ blinded decryption of a message encrypts a clear message with an encryption key, forming an encrypted message. The encryption key is a published Diffie-Hellman public key of a third party and is of the form $g^x$ mod p, where g and p are publicly known and x is maintained as a secret by the third party. The first node selects a number y, which may be a randomly generated number, and raises the public key of the third party to the power y, resulting in $g^{xy}$ mod p. The first node also computes and saves the value of $g^y$ mod p. The first node uses $g^{xy}$ mod p as an encryption key to encrypt the desired information and keeps the message encrypted with $g^{xy}$ mod p and the value $g^y$ mod p, but discards y and $g^{xy}$. Later to securely recover the encrypted message, the first node selects a blinding function z, computes the exponentiative inverse of z as $z^{-1}$, and raises $g^y$ mod p to the power z resulting in $g^{yz}$ mod p. The blinded key $g^{yz}$ mod p is provided to the third node that raises the blinded function $g^{yz}$ mod p to the power x resulting in $g^{xyz}$ mod p. The function $g^{xyz}$ mod p is provided to the first node and $g^{xyz}$ mod p is raised to the power $z^{-1}$ mod p by the first node to obtain $g^{xy}$ mod p. The decryption is accomplished using $g^{xy}$ mod p since this was the encryption key used by the first node to encrypt the data.

In another embodiment, a first node that desires to employ blinded decryption of a message requires the cooperation of an encryption agent to encrypt the clear message. The encryption/decryption agent maintains a secret encryption key, x, and a secret decryption key that is the exponentiative inverse of x. To encrypt the clear message, the first node selects a number R, which may be randomly generated, and computes the exponentiative inverse $R^{-1}$ that satisfies $R * R^{-1} = 1$ mod p-1. To blind the clear message M, the first node raises the clear message M to the number R to obtain $M^R$ mod p. The first node provides the blinded message $M^R$ mod p to the encryption/decryption agent that encrypts the blinded message with the encryption key x by raising the blinded message to the power x mod p, $M^{Rx}$ mod p. The first node unblinds the encrypted message by raising $M^{Rx}$ mod p to the previously calculated exponentiative inverse $R^{-1}$ mod p to obtain the encrypted message $M^x$ mod p. To decrypt the message, the node desiring to decrypt selects a blinding number j, which may be randomly generated, and computes the exponentiative inverse of j as $j^{-1}$. The node raises the encrypted message $M^x$ mod p to the power j mod p to obtain $M^{xj}$ mod p. The blinded encrypted message $M^{xj}$ mod p is provided to the encryption/decryption agent, where the encryption/decryption agent decrypts the blinded encrypted message using the decryption key that is the previously calculated exponentiative inverse $x^{-1}$ mod p. The encryption/decryption agent raises the blinded encrypted message $M^{xj}$ mod p to the power $x^{-1}$ mod p to obtain the blinded message $M^j$ mod p. The blinded message is returned to the node and unblinded using the previously calculated exponentiative inverse, mod p, of j, $j^{-1}$ mod p, by raising the blinded message to the power $j^{-1}$ mod p to obtain the clear message M.

Other features, aspects and advantages of the above-described method and system will be apparent from the detailed description of the invention that follows.

BRIEF DESCRIPTION OF THE SEVERAL VIEWS OF THE DRAWING

The invention will be more fully understood by reference to the following detailed description of the invention in conjunction with the drawing of which.

DETAILED DESCRIPTION OF THE INVENTION

A system and method in accordance with the present invention for performing encryption and decryption so as to preclude access to the information being encrypted and/or decrypted is disclosed.

It is well-known how to compute exponentiative inverses mod a prime p. Exponentiative inverses are numbers x and x-1 such that any number $(K^x)^{x^{-1}}$ mod p=K. The exponentiative inverse, mod p, of x is computed as the multiplicative inverse of x mod p-1, where p is a prime number. We use {M}K to denote a message M encrypted with a key K. When we use the term "p" in mod p arithmetic, p is a prime.

Figure 1:
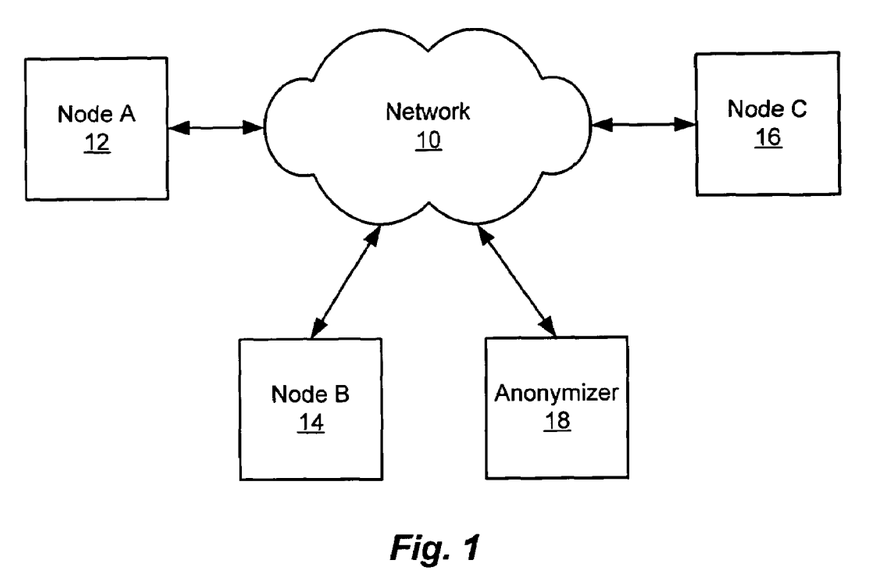
FIG. 1 is a block diagram depicting a system operative in a manner consistent with the present invention.

Referring to FIG. 1, the system includes a first node, Node A 12, a second node, Node B 14, a third node, Node C 16, and optionally, an Anonymizer node 18. Node A 12, Node B 14, Node C 16, and the Anonymizer Node 18 are communicably coupled via a Network 10, such as a wide area network, a local area network, or a global communications network such as the Internet. Either Node A 12 or Node B 14 are operative to generate a message or to obtain a message that is to be encrypted such that a third party is required to decrypt the message. In the present context, the term "message" is used generally to refer to any information that is desired to be encrypted and later decrypted and may be securely stored at Node A 12 or communicated from Node A 12 to Node B 14. Node C 16 comprises a decryption agent that is employed in the retrieval of the encrypted message from Node A 12 or Node B 14. The function of the Anonymizer 18 is subsequently discussed.

As described herein, the present system provides a mechanism by which a message may be stored for Node A 12 or Node B 14 while requiring the involvement of Node C in the decryption process. The involvement of a third node in the decryption process is desirable in certain circumstances, such as ephemeral decryption and certified communication of messages, or retrieval of secret keys that have been encrypted. Moreover, the present system prevents the third node, Node C 16, from obtaining access to the information contained within the encrypted message.

As discussed in more detail below, the techniques of blind encryption and/or blind decryption render the need to authenticate the two parties moot. The encryption/decryption agent(s) do not need to know on whose behalf it is performing the encryption or decryption. As known in the art, an Anonymizer node substitutes its address as the source address in place of the source address of the originating node. In this manner, the destination node, i.e. Node C 16 in the instant case, obtains no information regarding the identity of the party (Node A 12) requesting assistance in the decryption process. Accordingly, since the identity of the parties is not a requirement, an extra level of security may be obtained in the embodiments that follow through the use of an Anonymizer node to hide the actual identities.

In addition, the secret decryption keys, and secret encryption keys when used, that are maintained by Node C 16 may comprise ephemeral keys that become inaccessible after a predetermined time or upon the occurrence of some predetermined condition. In the event that ephemeral keys are employed by the decryption agent, the message M will only be accessible to Node A 12 if presented to the decryption agent Node C 16 within the time frame in which the respective ephemeral key maintained at Node C 16 is valid.

Figure 2:
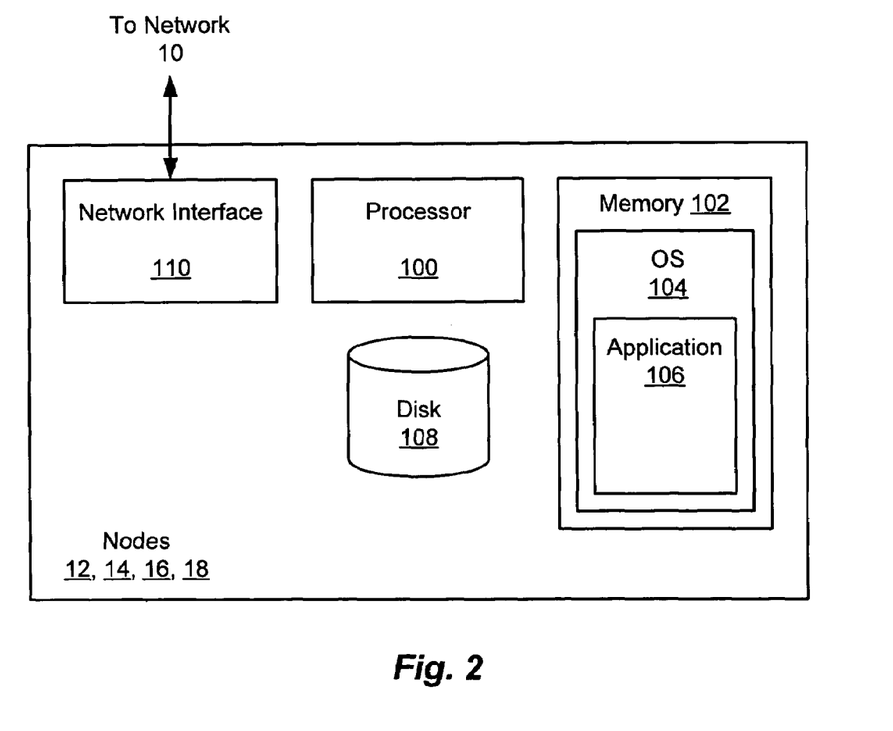
FIG. 2 is a block diagram depicting typical nodes within the system illustrated in FIG. 1.

As illustrated in FIG. 2, the Nodes A 12, B 14, C 16 and the Anonymizer node 18 typically include a processor 100 that is operative to execute programmed instructions out of an instruction memory 102. The instructions executed in performing the functions herein described may comprise instructions stored within program code considered part of an operating system 104, instructions stored within program code considered part of an application 106, or instructions stored within program code allocated between the operating system 104 and the application 106. The memory 102 may comprise Random Access Memory (RAM), or a combination of RAM and Read Only Memory (ROM). The Nodes A 12, B 14, C 16 and the Anonymizer node 18 each typically include a network interface 110 for coupling the respective node to the network 10. The Nodes A 12, B 14, C 16 and the Anonymizer node 18 may optionally include a secondary storage device 108 such as a disk drive, a tape drive or any other suitable secondary storage device.

Figure 3:
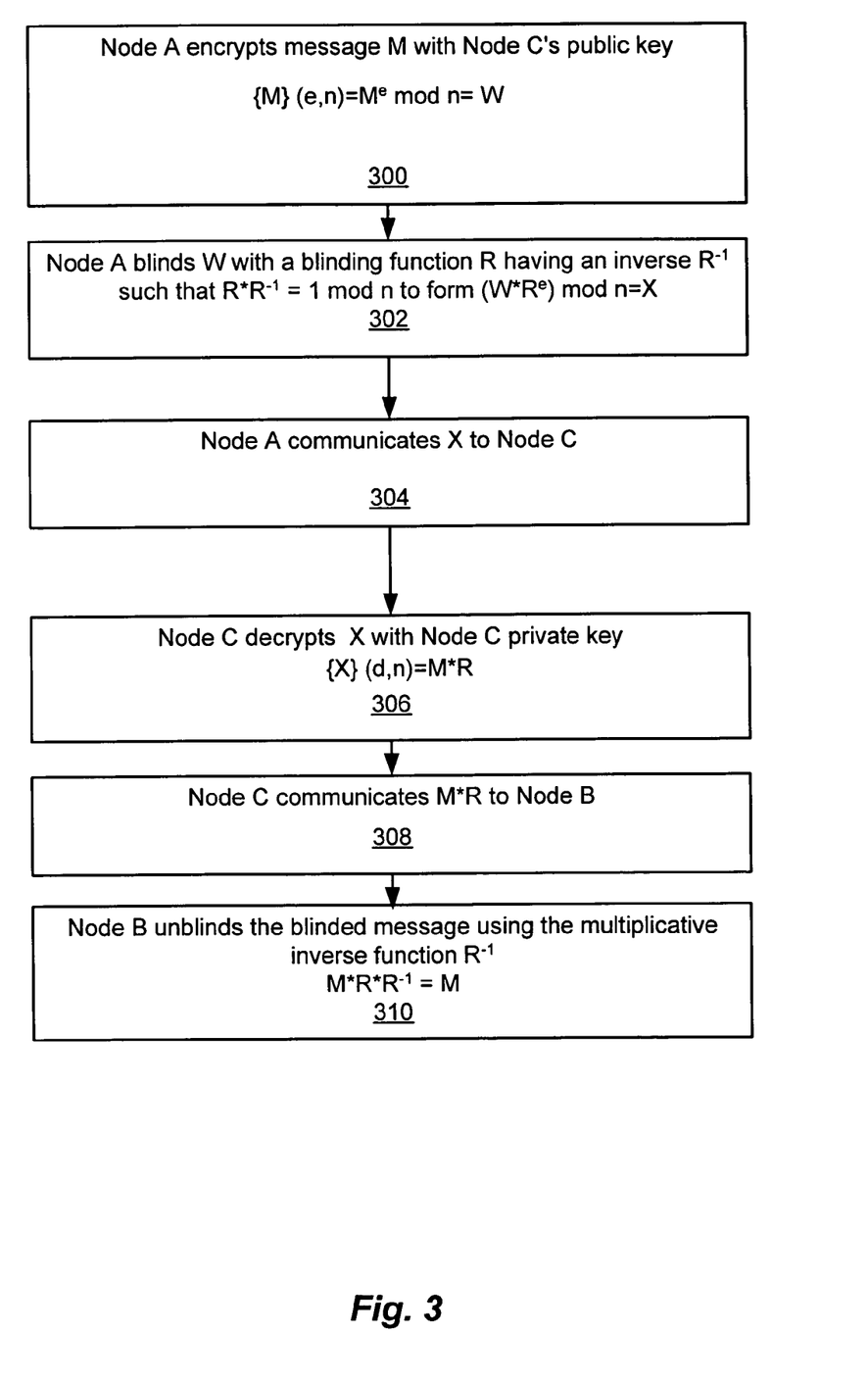
FIG. 3 is a flow diagram depicting a method for performing blinded decryption in the system depicted in FIG. 1.

A method for performing blind decryption of a message at Node A 12 in a manner consistent with the present invention is depicted in the flow diagram of FIG. 3. Referring to FIG. 3, Node A 12 generates or obtains a clear message M. Node A 12 applies the RSA public key (e,n) of Node C 16 and encrypts M with the RSA public key of Node C 16 as depicted in step 300 to obtain an encrypted value $W=M^e$ mod n. Encryption in this embodiment is performed without the cooperation of an encryption agent since encryption is performed using the decryption agent's public key (e,n).

After encrypting M with the Node C 16 RSA public key, to decrypt the encrypted message W, Node A 12 blinds W with a number R having a multiplicative inverse $R^{-1}$ that satisfies $R*R^{-1}=1$ mod n. Using the RSA public key (e,n), Node A 12 raises R to the power e mod n forming $R^e$ mod n and multiplies this result with the encrypted value W, as shown in step 302 to obtain a blinded value $X=(R^e*M^e)$ mod n. As shown in step 304, Node A 12 communicates the blinded value X to the decryption node, Node C 16 via the Network 10. Following receipt of the value X, Node C 16 decrypts X with the Node C 16 RSA private key (d,n) by raising X to the power d mod n, leaving a blinded message M*R, as depicted in step 306.

The decryption agent node C 16 forwards the blinded message M*R to Node A 12 as depicted in step 308. Node A 12 unblinds M*R by multiplying by the multiplicative inverse of R, $R^{-1}$ mod n to obtain the original message M as illustrated in step 310.

The blinding number R and its multiplicative inverse $R^{-1}$ mod n must be suitable for use with the RSA public/private keys described above such that the blinding number is interleaved with the encrypted message and does not change the message when the decryption and unblinding functions are applied to the blinded encrypted message. Accordingly, R must be of a suitable length and may be randomly generated.

Figure 4A:
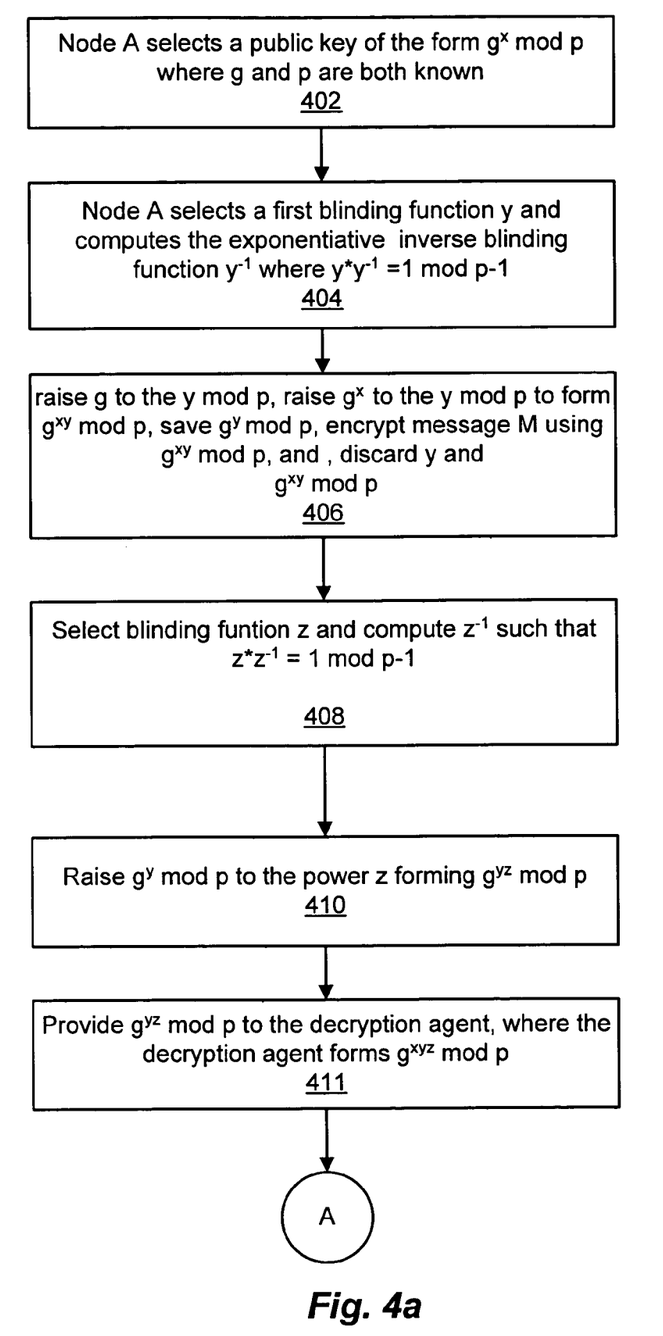
FIGS. 4a and 4b are a flow diagram depicting a method for performing blinded encryption and decryption in the system depicted in FIG. 1.
Figure 4B:
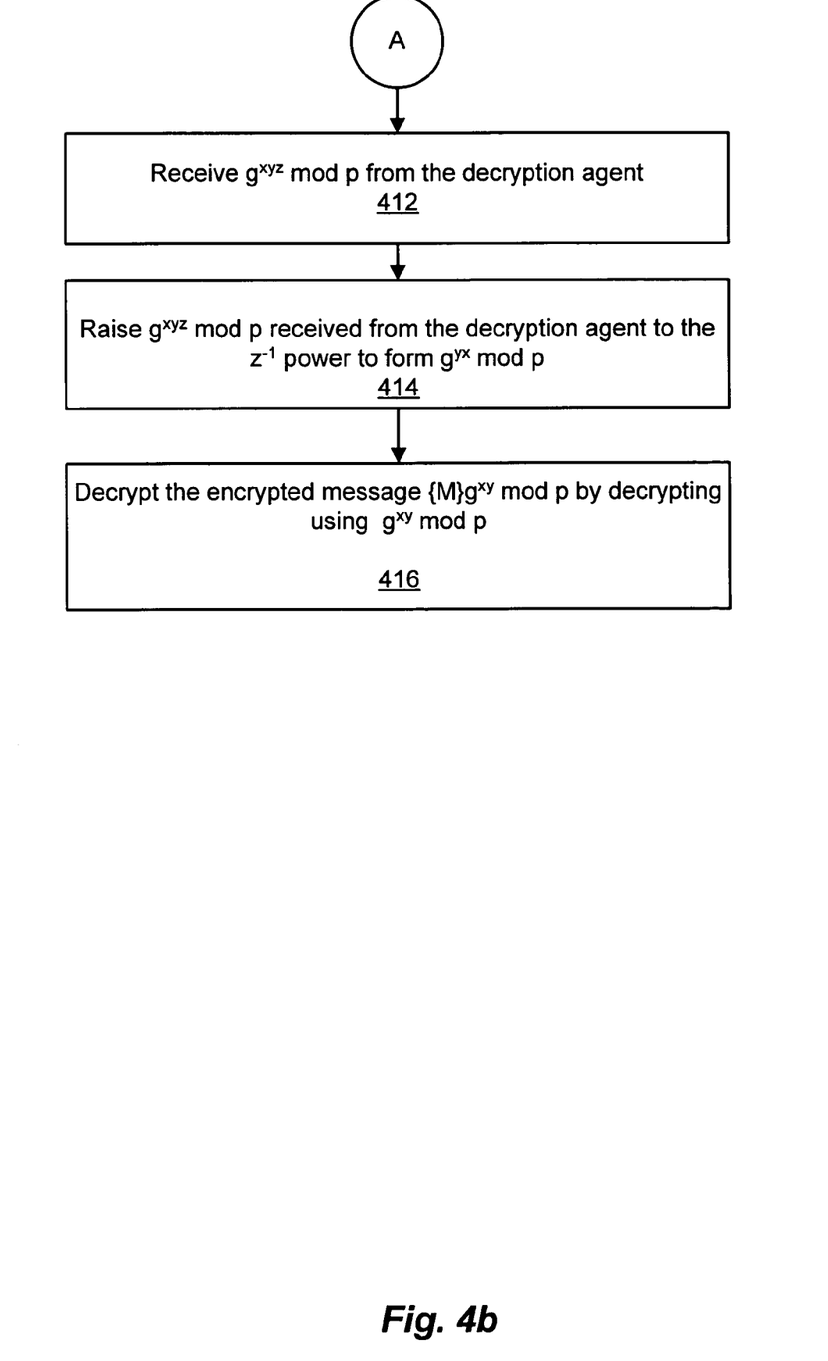

Another method for performing the blind decryption of a message using a published Diffie-Hellman public key of the form $g^x$ mod p is depicted in the flow diagram of FIGS. 4a and 4b (collectively referred to as FIG. 4). Referring to FIG. 4, Node A 12 generates or obtains a clear message M. A decryption agent publishes the public Diffie-Hellman encryption key in the form $g^x$ mod p, where the base, g, and the modulus, p, may be both publicly available. The decryption agent maintains x as a secret key, as depicted in step 402. To encrypt the clear message M, Node A selects a first number y, which may be randomly generated, and raises the public key to the power y mod p to form a second number, $g^{xy}$ mod p, as depicted in step 404. Node A then encrypts the clear message M with the key $g^{xy}$ mod p to form an encrypted message, $\{M\}g^{xy}$ mod p. In addition, Node A 12 raises the base g to the power y mod p. Node A then saves the encrypted message $\{M\}g^{xy}$ mod p and the value $g^y$ mod p and discards y and $g^{xy}$ mod p, as depicted in step 406. For decryption purposes, Node A selects a blinding number z, and computes the exponentiative inverse $z^{-1}$, as depicted in step 408. Node A raises the value $g^y$ to the power z mod p to blind $g^y$ mod p to form $g^{yz}$ mod p, as depicted in step 410. Node A provides $g^{yz}$ mod p to the decryption agent. The decryption agent then raises the value of $g^{zy}$ mod p to the power x mod p to form $g^{xyz}$ mod p, as depicted in step 411. The decryption agent then provides $g^{xyz}$ mod p to Node A as depicted in step 412. Node A raises the value $g^{xyz}$ mod p to the power of the exponentiative inverse function $z^{-1}$ to form $g^{xy}$ mod p as depicted in step 414. Node A then uses the value $g^{xy}$ to decrypt the encrypted message, as depicted in step 416.

In the above-described embodiment the first number and blinding number, y and z, respectively, can be independently selected integer random numbers and are kept secret. The size of the integer random numbers should be sufficiently large to withstand a cryptoanlytical attack by the decryption agent or some other party.

Figure 5A:
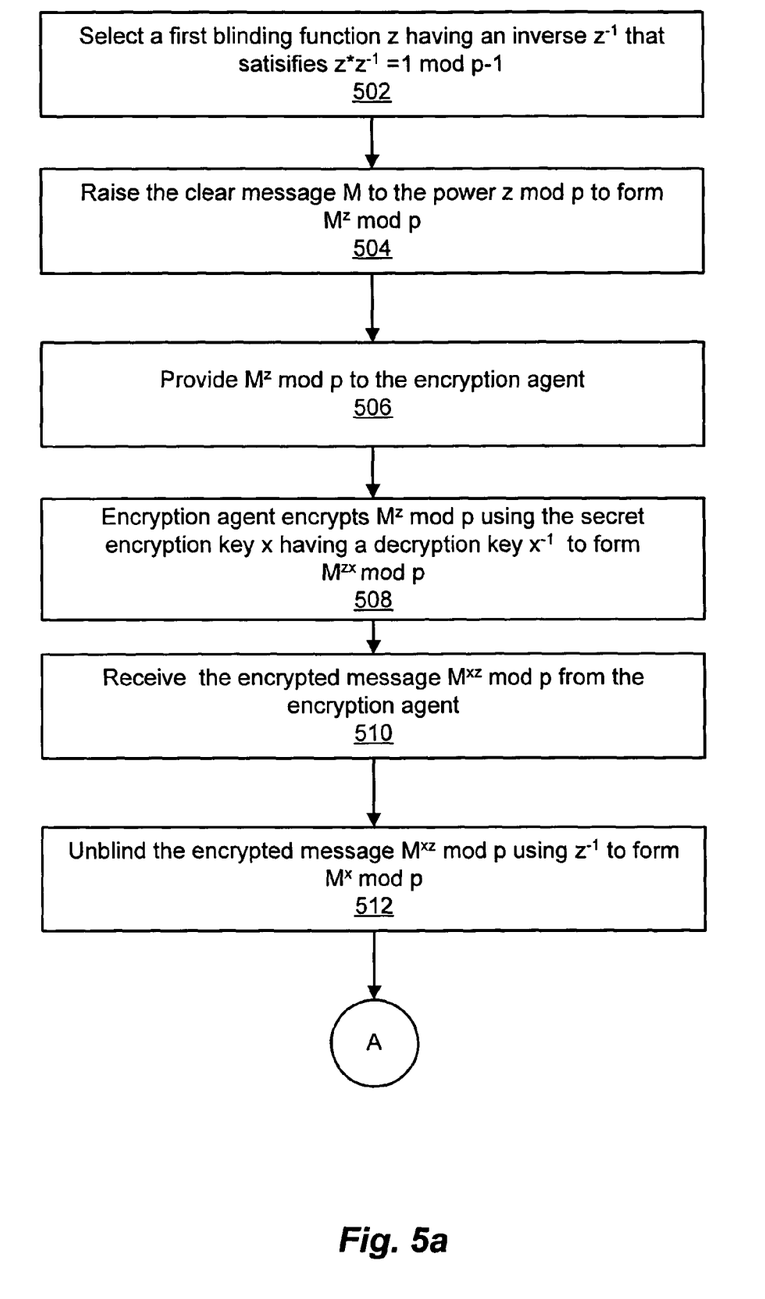
FIGS. 5a and 5b are a flow diagram depicting a method for performing blinded decryption in the system depicted in FIG. 1.
Figure 5B:
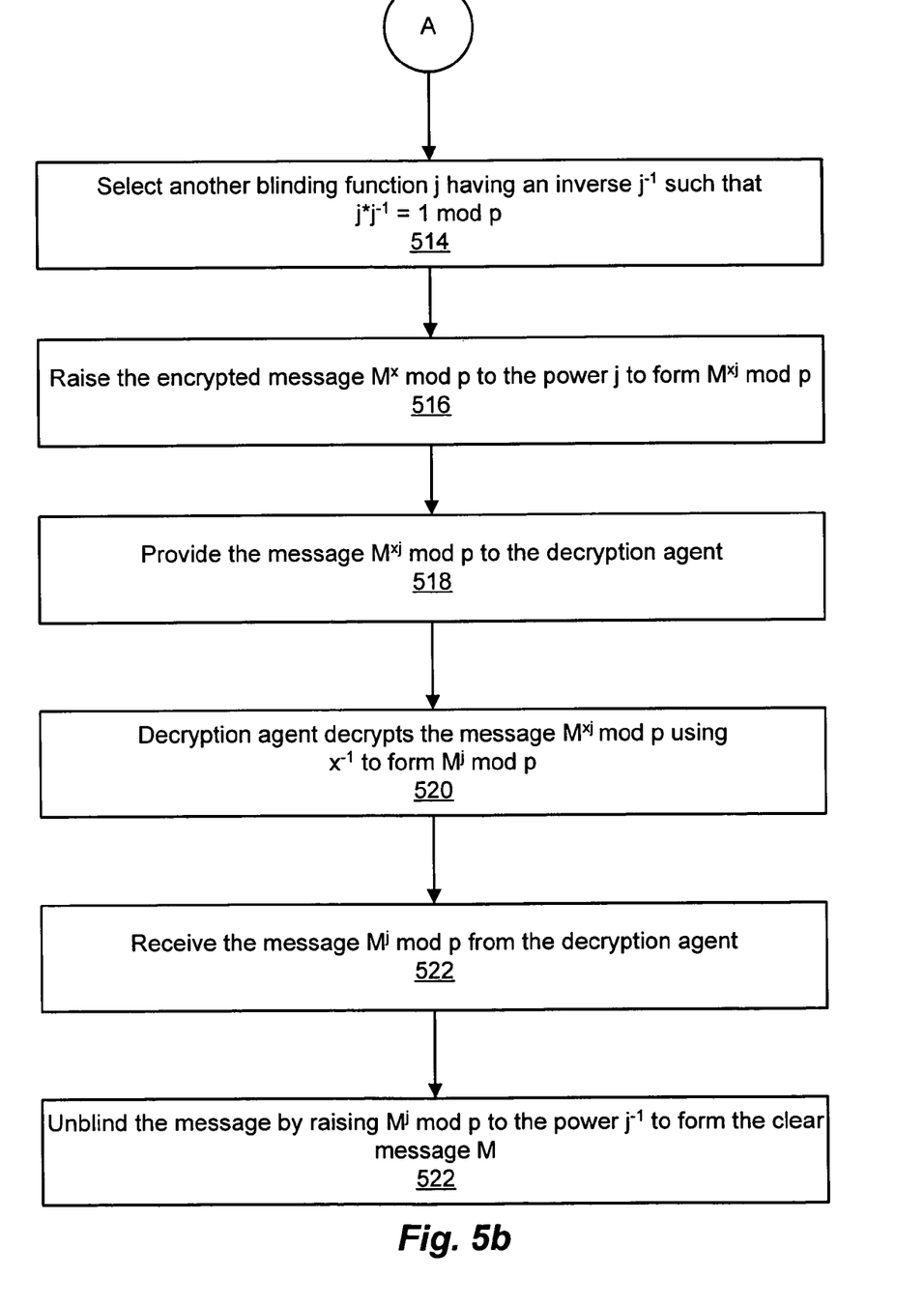

A method for performing the blind encryption and decryption of a message by Node A 12 is depicted in the flow diagram of FIGS. 5a and 5b (collectively referred to as FIG. 5). In this embodiment, the encryption agent and decryption agent, which may be the same node and be an encryption/decryption agent, compute secret encrypting functions and secret decrypting functions that are inverses of one another to encrypt and decrypt the message respectively, and the respective encryption and decryption agents maintain these functions as secrets. Typically, the encryption/decryption functions are a number x and the exponentiative inverse $x^{-1}$. To encrypt the message M, M is raised to the power x mod p forming $M^x$ mod p and to decrypt the message, the encrypted message $M^x$ mod p is raised to the power $x^{-1}$ mod p leaving M.

Referring to FIG. 5, Node A 12 generates or obtains a clear message M to be securely communicated to Node B 14. Node A selects a first blinding number z and computes a first inverse blinding function $z^{-1}$ that is the exponentiative inverse $z^{-1}$, as depicted in step 502. Node A raises the clear message M to the power z mod p, forming a blinded message $M^z$ mod p, as depicted in step 504. Node A provides the blinded message to an encryption agent, as depicted in step 506. The encryption agent encrypts the blinded message, by raising the blinded message $M^z$ mod p to the power x mod p, forming a blinded encrypted message $M^{xz}$ mod p, as depicted in step 508. The encryption agent returns the blinded encrypted message $M^{xz}$ mod p to Node A, as depicted in step 510. Node A unblinds the blinded encrypted message, $M^{xz}$ mod p, by raising it to the power $z^{-1}$ forming an encrypted message $M^x$ mod p, as depicted in step 512.

As depicted in step 514 Node A selects a second blinding number j and computes a second inverse blinding number $j^{-1}$ that is the exponentiative inverse of j. Node A raises the encrypted message to the power of the blinding number j mod p, forming $M^{jx}$ mod p which is the blinded encrypted message, as depicted in step 516. Node A provides the blinded encrypted message $M^{jx}$ mod p to the decryption agent, as depicted in step 518. The decryption agent decrypts the blinded encrypted message by raising the blinded encrypted message to the power of the decryption value, $x^{-1}$ mod p, to form a blinded message, $M^j$ mod p, as depicted in step 520. The decryption agent provides the blinded message, $M^j$ mod p to Node A, as depicted in step 522. Node A unblinds the blinded message, $M^j$, by raising the blinded message to the power of the second inverse blinding number, $j^{-1}$, forming the clear message M, as depicted in step 524.

In the above-described method, the first, second, and third blinding functions, z, j, and k can be independently selected integer random numbers and are kept secret. The size of the integer random numbers should be sufficiently large to provide blinding protection that is sufficient to thwart the blinding of the message by the encryption or decryption agents or some other party that may be interested in the clear message M. In the embodiment in which z, j, and k are integer random numbers, the first, second, and third blinding functions are then computed as the exponentiative inverses.

The above-described techniques for performing blinded encryption and decryption are illustrated above using public/private key pairs. For a decryption agent that provides a public encryption key E, maintains a secret private decryption key D, and in which the node selects a blinding function B and an inverse blinding function U, any combination of functions E, B, D, and U that work as E, B, D, U to provide the clear message M can be used. In the embodiment in which an encryption/decryption agent that maintains a pair of secret encryption/decryption functions E and D and in which the node selects a first blinding function B and a first inverse blinding function U and a second blinding function B' and a second blinding function U', any combination of functions E, B, D, and U that work as B, E, U, B', D, U' to provide the clear message M can be used. In addition, although the encryption and decryption agents can be separate nodes performing the corresponding encryption and decryption functions respectively, a single node can perform both the encryption and decryption functions. In addition, the encryption/decryption steps and the blinding/unblinding steps can be performed in any order.

Those skilled in the art should readily appreciate that programs defining the functions of the disclosed cryptographic system and method for providing blinded encryption and decryption can be implemented in software and delivered to a computer system for execution in many forms; including, but not limited to: (a) information permanently stored on non-writable storage media (e.g. read only memory devices within a computer such as ROM or CD-ROM disks readable by a computer 1/0 attachment); or (b) information stored on writable storage media (e.g. floppy disks and hard drives). In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

It should be appreciated that other variations to and modifications of the above-described method and system for performing blinded encryption and/or decryption may be made without departing from the inventive concepts described herein. Accordingly, the invention should not be viewed as limited except by the scope and spirit of the appended claims.

What is claimed is:

1. A method for performing blind decryption of a message M, wherein said message is encrypted by a first node using an encryption function to form an encrypted message, the method comprising the steps of:
    blinding said encrypted message with a blinding function z to form a blinded and encrypted message, wherein z has an inverse $z^{-1}$;
    in a first communicating step, communicating said blinded and encrypted message to a decryption agent;
    decrypting said blinded and encrypted message by said decryption agent using a decryption function to form a blinded message, wherein said decryption function is the inverse of said encryption function;
    in a second communicating step, communicating said blinded message to said first node; and
    unblinding said blinded message using $z^{-1}$, to obtain said message M,
    wherein said decryption function comprises an ephemeral decryption key.

2. The method of claim 1 wherein said first node and said decryption agent are communicably coupled via a network, and at least one of said first and second communicating steps comprises the step of communicating the respective message over said network.

3. The method of claim 2 wherein said first and second communicating steps comprise communicating the respective messages over said network.

4. The method of claim 1 wherein said first communicating step comprises the step of communicating said blinded and encrypted message from said first node to said decryption agent via an anonymizer node and said second communicating step comprises the step of communicating said blinded message from said decryption agent to said first nose via said anonymizer node.

5. The method of claim 1 further including the step of rendering said ephemeral decryption key unusable after a predetermined time.

6. The method of claim 1 further including the step of generating said message M at said first node.

7. The method of claim 1 wherein said encryption and decryption functions are, respectively, public and private keys of a public key pair.

8. The method of claim 7 wherein said public and private keys comprise a RSA public/private key of the form (e,n) and (d,n), respectively.

9. The method of claim 8 wherein said blinding function, z, is a blinding number of R having an inverse $R^{-1}$ that satisfies $R*R^{-1}=1$ mod n and wherein said blinding step includes the step of forming said blinded and encrypted message as the product $(R^e*M^e$ mod n$)$ where $(M^e$ mod n$)$ is said message M encrypted using said public encryption key.

10. The method of claim 9 wherein the decryption step includes raising the product $((R^e*M^e)$ mod n$)$ to the power d mod n, forming $((R^e*M^e)$ mod n$))^d$ mod n to form said blinded message R*M mod n.

11. The method of claim 10 wherein the unblinding step includes unblinding said blinded message R*M mod n using $R^{-1}$ obtain said message M.

12. The method of claim 9 further including the step of generating an integer random number and utilizing said random number as the blinding number R.

13. The method of claim 9 further comprising the steps of:
    obtaining a public key associated with said decryption agent, wherein said public key is a Diffie-Hellman public key of the form $g^x$ mod p;
    selecting a blinding number, y, having an inverse blinding function $y^{-1}$ that satisfies $y*y^{-1}=1$ mod $p^{-1}$;
    raising said public key $g^x$ mod p to the power y to obtain $g^{xy}$ mod p;

raising g to the power y to form $g^y$ mod p;

encrypting said message M using $g^{xy}$ mod p to form said encrypted message of the form $\{M\}g^{xy}$ mod p;

saving a copy of said encrypted message $\{M\}g^{xy}$ mod p; and saving a copy of $g^y$ mod p by said first node.

14. The method of claim 13 wherein said step of decrypting said blinded and encrypted message by said first node includes:

selecting a blinding number, w, having an inverse blinding number $w^{-1}$ that satisfies $w*w^{-1} = 1$ mod $p^{-1}$;

raising, by said first node, said public key $g^x$ mod p to the power w to obtain $g^{yw}$ mod p;

forwarding $g^{yw}$ mod p to said decryption agent;

receiving $g^{xyw}$ mod p from said decryption agent;

raising $g^{xyw}$ mod p to said inverse blinding number, $w^{-1}$, to form $g^{xy}$ mod p; and decrypting said encrypted message $\{M\}g^{xy}$ mod p using $g^{xy}$ mod p to obtain said message M.

15. The method of claim 13 wherein said blinding number, y, is a randomly selected integer.

16. The method of claim 14 wherein said blinding number, w, is a randomly selected integer.

17. A method for performing blind decryption of a message M, wherein said message is encrypted by a first node using an encryption function to form an encrypted message, the method comprising the steps of:

blinding said encrypted message with a blinding function z to form a blinded and encrypted message, wherein z has an inverse $z^{-1}$;

in a first communicating step, communicating said blinded and encrypted message to a decryption agent;

decrypting said blinded and encrypted message by said decryption agent using a decryption function to form a blinded message, wherein said decryption function is the inverse of said encryption function;

in a second communicating step, communicating said blinded message to said first node;

unblinding said blinded message using $z^{-1}$, to obtain said message M;

selecting a blinding number y having an inverse blinding number $y^{-1}$;

blinding said message M using said blinding number y to form a first blinded message;

forwarding said first blinded message to an encryption agent;

encrypting, by said encryption agent, said first blinded message to form a first blinded and encrypted message wherein said encryption is performed using said encryption function and wherein said encryption function and said corresponding decryption function are secret encryption and decryption keys, respectively;

forwarding said first blinded and encrypted message from said encryption agent to said first node; and unblinding said first blinded and encrypted message using inverse blinding number $y^{-1}$ to form said encrypted message.

18. The method of claim 17 wherein step of blinding said message using said blinding number y to form said first blinded message includes a step of raising said message M to the power y mod p.

19. The method of claim 18 wherein said secret encryption key is a value x and wherein said secret decryption key is $x^{-1}$ and wherein said step of encrypting said blinded message includes the step of raising said first blinded message $M^y$ mod p to the power x mod p to form said first blinded and encrypted message.

20. The method of claim 19 wherein said step of unblinding said first blinded and encrypted message includes the step of raising said first blinded and encrypted message $M^{xy}$ mod p to the power $y^{-1}$ mod p, to obtain said encrypted message $M^x$ mod p.

21. The method of claim 20 wherein said step of decrypting said first blinded message by said decryption agent includes the step of raising said first blinded message to said secret decryption key $x^{-1}$ to form a second blinded message $M^z$ mod p.

22. A system for performing blind decryption of a message M comprising:

a first node and a decryption agent communicably coupled via a communications network;

said first node operative to:

encrypt said message using an encryption function to form an encrypted message;

blind said encrypted message with a blinding function z to form a blinded and encrypted message, wherein z has an inverse $z^{-1}$;

communicate said blinded and encrypted message to a decryption agent;

decrypt said blinded and encrypted message by said decryption agent using a decryption function to form a blinded message, wherein said decryption function is the inverse of said encryption function;

communicate said blinded message to said first node; and unblind said blinded message using $z^{-1}$, to obtain said message M, wherein said decryption function comprises an ephemeral decryption key.

23. A computer program product including a computer readable medium, said computer readable medium having a computer program stored thereon for use in blinded ephemeral decryption, said computer program being executable on processors in a first node and a decryption agent respectively, said computer program product comprising:

program code for execution on said processor in said first node for blinding said encrypted message with a blinding function z to form a blinded and encrypted message, wherein z has an inverse $z^{-1}$ and for communicating said blinded and encrypted message to a decryption agent;

program code for execution on said processor in said decryption agent for decrypting said blinded and encrypted message by said decryption agent using a decryption function to form a blinded message, wherein said decryption function is the inverse of said encryption function and for communicating said blinded message to said first node; and program code for execution on said processor in said first node for unblinding said blinded message using $z^{-1}$, to obtain said message M, wherein said decryption function comprises an ephemeral decryption key.

24. The method of claim 17, wherein said step of decrypting said first blinded message by said decryption agent includes the step of raising said first blinded message to said secret decryption key $x^{-1}$ to form a second blinded message $M^z$ mod p.

* * * * *